United States Patent [19]
Dewhurst

[11] 3,759,128
[45] Sept. 18, 1973

[54] MEAT SLICING MACHINE

[76] Inventor: Bert F. Dewhurst, 1244 Justin Ave., Glendale, Calif. 91201

[22] Filed: June 28, 1972

[21] Appl. No.: 266,992

[52] U.S. Cl.............. 83/411 R, 83/423, 83/425.3, 83/751
[51] Int. Cl............................ B26d 4/06, B26d 7/06
[58] Field of Search............... 83/411 R, 423, 425.2, 83/425.3, 427, 431, 436, 733, 751, 762

[56] References Cited
UNITED STATES PATENTS

| | | | |
|---|---|---|---|
| 2,528,853 | 11/1950 | Brustowsky | 83/751 |
| 2,503,976 | 4/1950 | Troyer | 83/423 |
| 3,089,526 | 5/1963 | Lykkeberg | 83/423 |
| 3,245,447 | 4/1966 | Jones | 83/425.2 |
| 3,538,802 | 11/1970 | Helm et al. | 83/411 R |

Primary Examiner—Willie G. Abercrombie
Attorney—Robert L. Parker et al.

[57] ABSTRACT

A meat slicing machine includes a supporting framework, a hopper attached to the framework, and a rotatable drum in the bottom of the hopper. A set of parallel, longitudinally reciprocating blades having upwardly facing cutting edges are disposed below the drum. Several series of longitudinally spaced apart fingers project outwardly from the drum surface. A piece of meat disposed in the hopper is forced against the fingers with the aid of a pressure plate in the hopper. The fingers stab the meat, and the drum rotates the meat progressively into contact with the reciprocating knife blades to slice the meat into several cuts. Meat can be continuously fed into the hopper and sliced, and an endless conveyor belt below the blades continuously discharges the cuts from the machine to a suitable receptacle.

5 Claims, 2 Drawing Figures

MEAT SLICING MACHINE

BACKGROUND OF THE INVENTION

This invention relates to meat slicing machines, and more particularly to a machine adapted to slice a continuous supply of meat into cuts of a chosen size.

At the present time, meat is shipped by large meat packers to central packing plants owned by various food market chains. In the central packing plants, the meat is broken down into "primal" cuts, such as shoulder cuts or loin cuts. The meat is also aged in the packing plants. The primal cuts are then shipped to the meat departments of the various retail stores owned by the food market chain, where the cuts are sliced, packaged, and sold to the consumer.

Generally speaking, meat cutters in the retail stores cut boned meat by hand. Boneless meat is usually cut by a conventional slicing machine having a rotary cutting disk which slices cuts one by one. Machines also have been used in the past for slicing a boneless primal cut into several cuts simultaneously. These machines generally include a movable plunger or pressure plate in a hopper for forcing meat directly into contact with a series of reciprocating knife blades. However, these machines have not saved much time when compared with the conventional rotary disk machine, because the plunger must be retracted after each piece of meat is sliced, and the meat often binds against the cutting blades, causing work to be interrupted.

SUMMARY OF THE INVENTION

This invention provides a meat slicing machine which is especially useful in reducing the time normally required to cut meat in a retail food store meat department. The machine is capable of receiving a continuous supply of boneless meat, such as primal cuts, and effectively slicing each piece of meat into several smaller cuts simultaneously.

Briefly, the meat slicing machine includes a supporting framework, a hopper attached to the framework, and a rotatable drum in the bottom of the hopper. A set of parallel, laterally spaced apart cutting blades having upwardly facing cutting edges is located beneath the drum. The cutting blades extend in a direction substantially perpendicular to the drum axis of rotation. The drum preferably has several series of outwardly projecting surface irregularities adapted to stab meat disposed in the hopper and rotate the meat along an arcuate path against the blades. Means are provided for reciprocating the set of blades lengthwise to slice the meat into several cuts simultaneously as it rotates into contact with the blades.

The rotatable drum moves the meat into contact with the blades by applying to the meat a force having a component in the direction parallel to the length of the blades. This causes the meat to move smoothly and progressively into contact with the blades, and substantially eliminates the chance of binding the blades. Moreover, the meat-receiving surface of the drum is constantly exposed to the operator of the machine, so the machine is capable of receiving and slicing a continuous supply of meat. Thus, there are no long interruptions in work, so the machine slices a substantially larger quantity of meat in a given time period than does the conventional hand-operated slicing disk or the plunger-operated slicing machines.

BRIEF DESCRIPTION OF THE DRAWINGS

These and other aspects of the invention will be more fully understood by referring to the following detailed description and the accompanying drawings in which.

DETAILED DESCRIPTION OF THE PREFERRED EMBODIMENT

Figure 1:
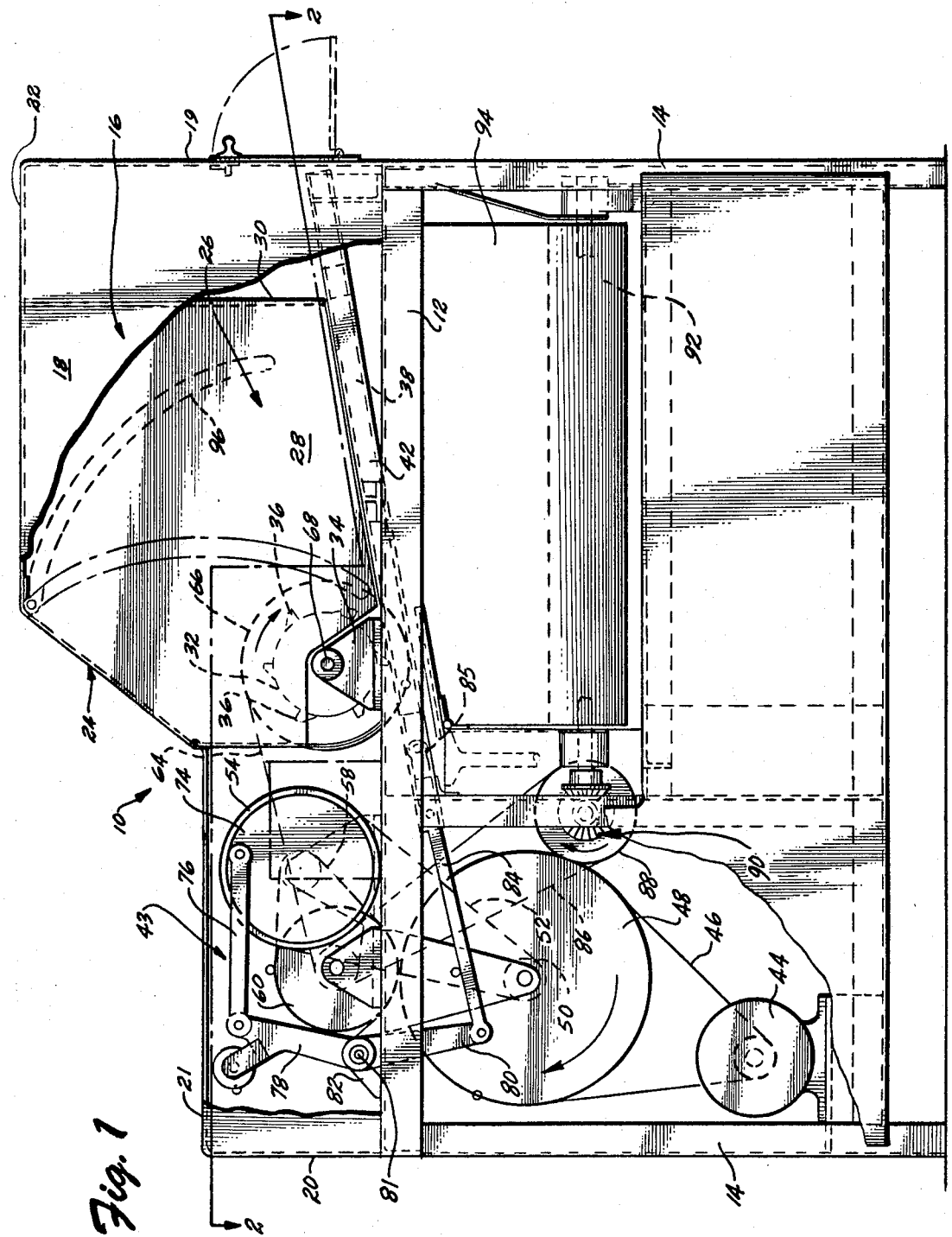
FIG. 1 is an elevation view, partly broken away, showing a meat slicing machine.

Referring to the drawings, a meat slicing machine 10 includes a supporting framework comprising a horizontally disposed rectangular frame 12 supported by upright legs 14 at the corners of the frame.

A housing 16 is mounted on horizontal frame 12. The housing includes a pair of laterally spaced apart side panels 18 extending along opposite edges of frame 12. Each side panel provides a relatively short side wall at the front portion of the machine, tapers upwardly at its middle, and provides a relatively tall side wall at the rear portion of the machine. An upright tall rear panel 19 extends between the rear edges of side plates 18, and an upright short front wall 20 extends between the front edges of side plates 18. A top panel 21 covers the short front walls of side panels 18, and a top panel 22 covers the tall rear walls of the side panels. The area between the tapered intermediate portions of the side panels is left uncovered to form a laterally extending, rectangular opening 24 between the side panels.

Opening 24 opens into a meat-receiving hopper 26 in the rear portion of the housing. The hopper includes a pair of laterally spaced apart side plates 28 spaced inwardly from side panels 18, and a rear panel 30 extending between side plates 28 and spaced forward of rear panel 19.

A horizontally disposed, laterally extending, elongated rotatable drum 32 extends between side plates 28 in the bottom of the hopper below opening 24. The drum shaft is journaled in bearings mounted in upright brackets 34 secured to frame 12. Several circumferentially spaced apart series of laterally spaced apart fingers 36 project radially outwardly from the drum surface.

Figure 2:
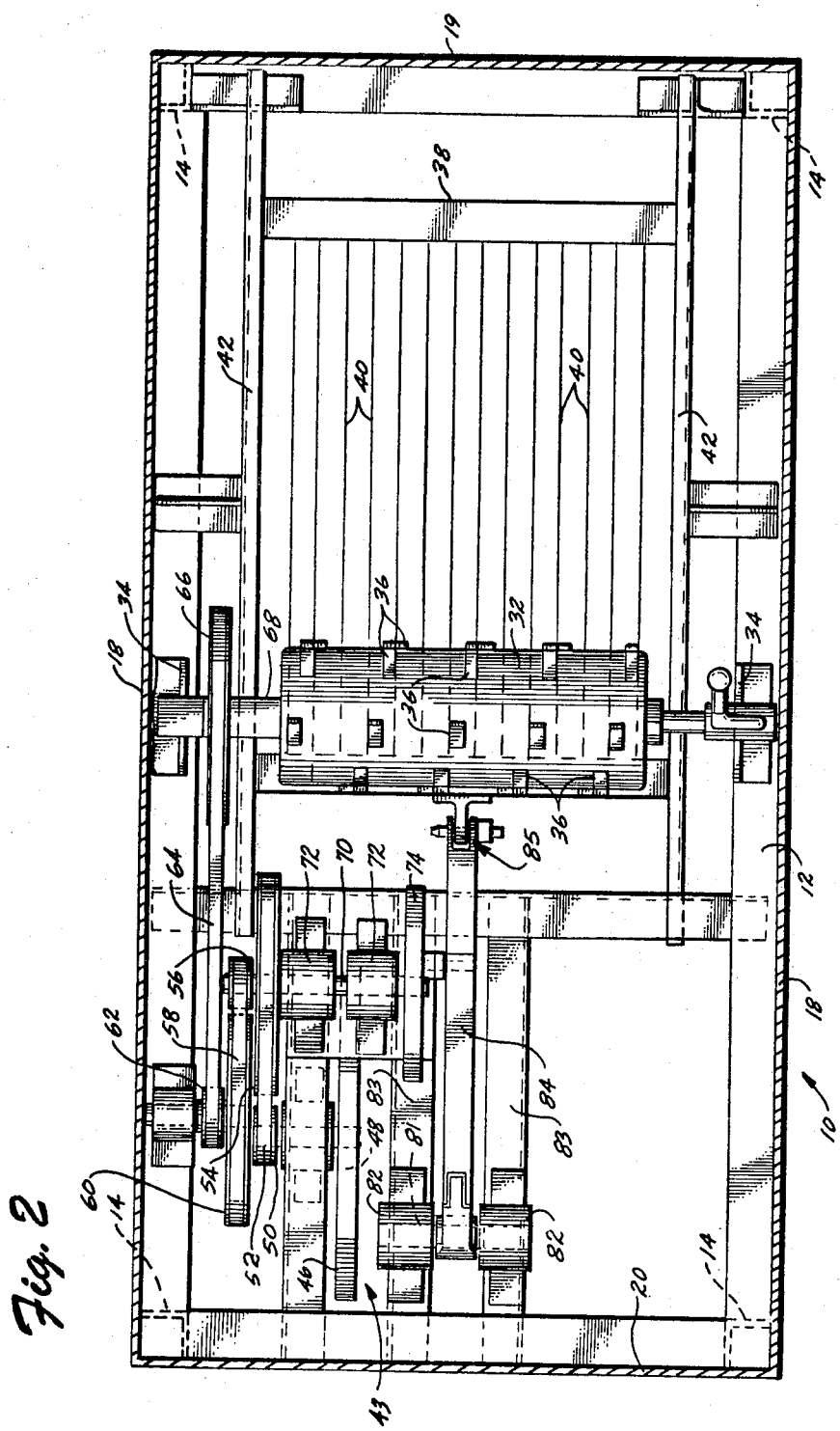
FIG. 2 is a plan elevation view taken on line 2—2 of FIG. 1.

A rectangular frame 38 holds a set of parallel, longitudinally extending, and laterally spaced apart knife blades 40 (shown best in FIG. 2) below the drum. The cutting edges of the blades face upwardly toward the drum. The knife blades are aligned in a plane which extends at an angle upwardly toward the rear of hopper 26. The knife blade frame 38 is adapted to reciprocate longitudinally in a pair of laterally spaced apart, angularly disposed guide channels 42 mounted on opposite sides of horizontal frame 12.

A drive mechanism 43 for rotating drum 32 and reciprocating blades 40 is located in the front portion of housing 16. The drive mechanism includes a rotary drive motor 44 having its output shaft coupled by a belt 46 to a large speed-reducing pulley 48. An output shaft 50 of pulley 48 of coupled by a belt 52 to a further speed-reducing pulley 54. An output shaft 46 of pulley 54 drives a belt 58 coupled to a speed-reducing pulley 60, which in turn has an output shaft 62 that drives a belt 64 coupled to a drive pulley 66 mounted on a drive shaft 68 which turns drum 32. The drum is rotated in a clockwise direction (as viewed in FIG. 1) so fingers 36 rotate toward the knife blades in the bottom of the hopper.

Pulley 54 rotates a laterally extending drive shaft 70 which is journaled in bearings mounted in bearing blocks 72 disposed in the front portion of the housing. Drive shaft 70 rotates a crank wheel 74 which drives a crank arm 76 pivotally coupled to a linkage 78 which, in turn, reciprocally drives a downwardly extending linkage 80. Linkages 78 and 80 are mounted on a reciprocating shaft 81 journaled in bearings mounted in bearing blocks 82 carried on horizontal cross-pieces 83 attached to the supporting framework 12. Rotation of crank wheel 74 causes linkage 80 to pivot in a reciprocating manner about its pivot through shaft 81. The front end of an elongated drive arm 84 is connected to the free end linkage 80, and reciprocates longitudinally as crank wheel 74 rotates. A coupling 85 releasably connects the rear end of drive arm 84 to the front of knife blade frame 38. Thus, cutting blades 40 reciprocate longitudinally as crank wheel 74 rotates in response to power supplied by drive motor 44 through the speed reducing mechanism.

The output shaft of pulley 60 also drives a belt 86 (not shown in FIG. 2 for clarity) coupled to drive pulley 88 mounted to the supporting framework below the reciprocating knife blades. Pulley 88 drives a pinion 90 which in turn drives a rearwardly extending and horizontally disposed drum 92 extending along one side of the machine below the reciprocating knife blades. An endless conveyor belt 94 extending laterally across the machine below the knife blades is driven by drum 92 and a cooperating idler drum (not shown) mounted for rotation at a point remote from the opposite side of the machine.

During operation of the meat slicing machine, pieces of meat (not shown) are fed into opening 24 of the hopper and placed against rotating drum 32. The revolving fingers 36 of the drum stab the meat as it is placed against the drum and rotate the meat toward reciprocating knife blades 40. A spring loaded arcuately curved pressure plate 96 pivotally mounted in the upper portion of the hopper adjacent opening 24 is urged toward the meat to apply pressure to the meat so it stays stabbed by the fingers and in contact with the drum as it rotates toward the knife blades. The rotating drum moves the meat into contact with the blades along an arcuate path and with a force having a component paralel to the length of the cutting blades. Thus, the meat is smoothly and progressively eased into contact with the knife blades, and as the drum continues to rotate, the meat is forced through the reciprocating blades until it is sliced into parallel cuts of a chosen width. The knife blade frame 38 is releasably connected to the reciprocating drive mechanism, and therefore can be replaced by other sets of blades having different spacings for cutting the meat to the desired thickness. Meat which has been sliced drops onto conveyor belt 94 which carries the sliced meat away from the machine to a suitable receptacle.

Thus, large primal cuts of meat can be continuously fed onto the rotating drum and sliced into cuts ready for packaging. The slicing machine cuts meat at a substantially faster rate than presently known machines used in retail markets. This reduces substantially the labor cost associated with the job of cutting meat in the retail food markets. However, the persons displaced by this increased savings can be used in the central packing plants to de-bone meat which, at the present time, is sent to the retail markets and sliced by hand. This de-boned meat can then be sliced by my machine, and thereby reduce further the labor cost associated with preparing meat for sale in retail food markets. Thus, the overall time required to supply packaged meat to the retail markets is reduced, which assures more fresh meat for the customer and saves money for the market.

I claim:

1. A machine for slicing a cut of meat comprising a supporting framework, a hopper attached to the framework, a rotatable drum in a lower portion of the hopper, a set of parallel, laterally spaced apart blades having upwardly facing cutting edges located beneath the drum and extending in a direction substantially perpendicular to the drum axis of rotation, the drum having several series of outwardly projecting surface irregularities adapted to stab the meat and rotate it along an arcuate path into engagement with the blades, and means for reciprocating the set of blades lengthwise to slice the meat as it rotates into contact with the blades.

2. Apparatus according to claim 1 including a spring-biased pressure plate in the hopper for forcing meat into contact with the drum.

3. Apparatus according to claim 1 in which the surface irregularities comprise several circumferentially spaced apart series of longitudinally spaced apart fingers projecting outwardly from the drum surface.

4. Apparatus according to claim 1 including means for releasably attaching the set of blades in a position below the drum so the blades may be replaced with a different set.

5. Apparatus according to claim 1 including a pressure plate spaced adjacent to one side of the drum, and in which the blades are disposed below the space between the drum and the pressure plate, and including means for rotating the drum toward the pressure plate and the blades.

* * * * *